US011453974B2

(12) United States Patent
Roberts et al.

(10) Patent No.: US 11,453,974 B2
(45) Date of Patent: Sep. 27, 2022

(54) METHOD OF COATING

(71) Applicant: SUBLINO LIMITED, Manchester (GB)

(72) Inventors: Philip Roberts, Manchester (GB); Michael Trevitt, Manchester (GB)

(73) Assignee: SUBLINO LIMITED, Manchester (GB)

( * ) Notice: Subject to any disclaimer, the term of this patent is extended or adjusted under 35 U.S.C. 154(b) by 958 days.

(21) Appl. No.: 16/085,135

(22) PCT Filed: Mar. 15, 2017

(86) PCT No.: PCT/GB2017/050703
§ 371 (c)(1),
(2) Date: Sep. 14, 2018

(87) PCT Pub. No.: WO2017/158351
PCT Pub. Date: Sep. 21, 2017

(65) Prior Publication Data
US 2020/0378060 A1    Dec. 3, 2020

(30) Foreign Application Priority Data

Mar. 17, 2016 (GB) .................................. 1604563

(51) Int. Cl.
| | |
|---|---|
| *D06M 13/46* | (2006.01) |
| *D06M 13/402* | (2006.01) |
| *D06M 14/08* | (2006.01) |
| *D06M 101/32* | (2006.01) |
| *D06P 5/22* | (2006.01) |

(52) U.S. Cl.
CPC .......... *D06M 13/46* (2013.01); *D06M 13/402* (2013.01); *D06M 14/08* (2013.01); *D06M 2101/32* (2013.01); *D06P 5/22* (2013.01)

(58) Field of Classification Search
USPC ........................... 428/395; 427/389; 264/123
See application file for complete search history.

(56) References Cited

U.S. PATENT DOCUMENTS

| | | | |
|---|---|---|---|
| 4,810,254 A | 3/1989 | Bauer et al. | |
| 9,797,088 B2 * | 10/2017 | Allen | D06P 1/41 |
| 2014/0315022 A1 | 10/2014 | Allen et al. | |
| 2015/0283784 A1 | 10/2015 | Allen et al. | |

FOREIGN PATENT DOCUMENTS

| | | |
|---|---|---|
| JP | S62-257481 A | 11/1987 |
| JP | H02-221470 A | 9/1990 |
| JP | H06-212577 A | 8/1994 |
| JP | 2003-524709 A | 8/2003 |
| WO | WO-94/25665 A1 | 11/1994 |

OTHER PUBLICATIONS

Hall et al., "Novel UV cured coatings and adhesives based on the photoinitiated cyclopolymerization of derivatives of diallylamine," Royal Society of Chemistry, 2003, pp. 2530-2531.
Hall et al., "The Photoinitiated Cyclopolymerization of Dienes in the Creation of Novel Polymeric Systems and Three-Dimensional Networks," Journal of Materials Chemistry, Royal Society of Chemistry, GB, vol. 14, Jul. 23, 2004, pp. 2593-2602.
International Search Report & Written Opinion in International Application No. PCT/GB2017/050703, dated Oct. 6, 2017.
Polysciences, Inc., "Poly(Diallyl Dimethyl Ammonium Chloride) [Mw ~ 8,500], 28 wt. % H2O," Accessed on Feb. 1, 2018 at https://www.polysciences.com/default/catalog-products/monomers-polymers/polymers/amine-functional-polymers/polydiallyl-dimethyl-ammonium-chloride-mw-8500/.
U.S. Food and Drug Administration, "Guidance for Industry and FDA Staff—Class II Special Controls Guidance Document—Wound Dressing with Poly(diallyl dimethyl ammonium chloride) (pDADMAC) Additive," Oct. 16, 2009, Available at https://www.fda.gov/medical-devices/guidance-documents-medical-devices-and-radiation-emitting-products/wound-dressing-polydiallyl-dimethyl-ammonium-chloride-pdadmac-additive-class-ii-special-controls.

* cited by examiner

*Primary Examiner* — Lynda Salvatore
(74) *Attorney, Agent, or Firm* — Foley & Lardner LLP

(57) ABSTRACT

There is provided a method of treating textile fibres including: a) providing a polymeric precursor including a diallyl amide cationic compound and a corresponding counter ion; b) either (i) coating the textile fibres with the polymeric precursor and polymerising the polymeric precursor to form a polymeric coating, or (ii) polymerising the polymeric precursor and contacting the polymerised polymeric precursor with the textile fibres to form a polymeric coating on the textile fibres. There is also provided a composite structure including a polymeric coating formed from the polymeric precursors of the present invention.

13 Claims, No Drawings

METHOD OF COATING

CROSS-REFERENCE TO RELATED APPLICATIONS

This application is a U.S. National Phase Application under 35 U.S.C. § 371 of International Application No. PCT/GB2017/050703, filed on Mar. 15, 2017, which claims the benefit of priority to GB Application No. 1604563.5, filed on Mar. 17, 2016, the contents of which are incorporated herein in their entirety.

The present invention relates to polymer precursors, polymers formed therefrom and a method of coating or treating a substrate including the use of such polymer precursors.

BACKGROUND TO THE INVENTION

Known adhesives, paints, inks and coatings generally contain a significant amount of organic solvents. The use of such organic solvents facilitates the application of known coatings to substrates, increases the speed of drying following application, and facilitates the formation of an even, regular coating. Following addition, organic solvents evaporate releasing volatile organic compounds (VOCs) into the atmosphere. Such release is hazardous for human health, being associated with respiratory conditions, cancer (in particular lung cancer), liver disease, skin and eye irritation, headaches, nausea and muscle weakness.

In addition, VOCs are a major contributing factor to the production of ozone. As well as the health concerns detailed above, other problems resulting from excessive ozone levels can include damage to the ecosystem and retardation of plant growth and crop yields.

Commonly used organic solvents are flammable, and their industrial use is associated with an increased risk of explosion.

Efforts have been made to reduce the use of organic solvents in paints, coatings and adhesives in order to overcome such environmental and health problems. However, the reduction or removal of organic solvents has been associated with a reduction in the performance of known coatings.

Known monomers for use in coatings such as adhesives, inks and paints commonly require high temperatures, pressures and/or polymerisation initiators or catalysts to initiate their polymerisation. There are cost and safety implications associated with such initiation. In addition, where known monomers are applied to heat sensitive substrates, the high temperatures necessary to initiate polymerisation will affect the integrity of the substrate.

It is therefore an object of the present invention to provide a method of coating or treating textile fibres to promote adhesion of the textile fibres with polymeric material or metals, and/or to fix dyes onto the textile fibres.

The present invention seeks to provide water soluble compounds suitable for use as coatings which eliminate the need for organic solvents. In addition, the compounds of the present invention are surprisingly easy to polymerise, requiring surprisingly mild conditions to initiate their polymerisation.

STATEMENT OF INVENTION

According to a first aspect of the present invention there is provided a compound of Formula I:

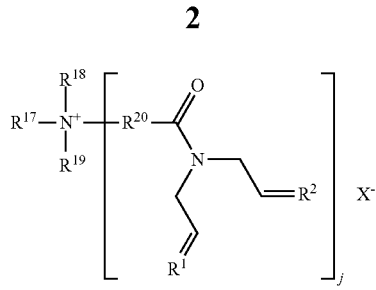

Wherein each of $R^{17}$ to $R^{19}$ independently represents an optionally substituted hydrocarbyl group, or hydrogen; generally an aliphatic hydrocarbon group (e.g. $C_{1-6}$ alkyl, alkenyl, alkynyl), in particular an optionally substituted alkyl group, typically $C_{1-6}$ alkyl.

$R^{20}$ represents an optionally substituted hydrocarbyl group, generally a $C_{1-6}$ alkyl group such as a methyl, ethyl or propyl group, suitably a methyl or ethyl group.

Each of $R^1$ and $R^2$ independently represents an optionally substituted hydrocarbyl group, generally $C_{1-6}$ alkyl, typically a methyl, ethyl or propyl group, suitably a methyl group.

J is an integer from 1 to 4 (generally 1 or 2), wherein where J is 2, one of $R^{17}$ to $R^{19}$ is absent,
where J is 3, two of $R^{17}$ to $R^{19}$ are absent,
where J is 4, all of $R^{17}$ to $R^{19}$ are absent.

$X^-$ is a counterion.

According to a second aspect of the present invention there is provided a compound of Formula II:

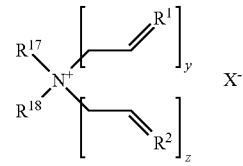

Wherein $R^1$, $R^2$, $R^{17}$, R and $X^-$ are as defined herein;
Y is an integer of from 1 to 3, generally 1;
Z is an integer of from 1 to 3, generally 1;
Wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent.

The compounds of either one of Formulae I and II may be referred to as polymeric precursors.

The counter-ions (X), are generally anions selected from the group consisting of halide (in particular chloride or fluoride), sulfate, sulfonate (such as 2-acrylamido-2-methylpropane sulfonate (AMPS)), sulfamate, phosphonate (in particular a vinyl phosphonate), lactate, acetate, glycoate, citrate and itaconate. Typically the counter-ions are anions selected from the group consisting of sulfate, sulfonate, sulfamate, phosphonate, lactate, acetate, glycoate, citrate and itaconate. Particular mention may be made of counter-ions including one or more of a phosphonate group and a basic nitrogen group.

According to one embodiment the counter-ions (X) include one or more groups polymerisable under the conditions used to polymerise the compounds of Formulae I and II. Suitably the counter-ions include one or more alkenyl groups.

According to an aspect of the present invention there is provided a copolymer formed from a polymeric precursor according to either one of Formulae I and II and one or more counter-ions, in particular one or more of the counter-ions described herein.

According to a further aspect of the present invention, there is provided a composition including one or more polymeric precursors according to either one of Formulae I and II and an aqueous solvent.

According to a further aspect of the present invention, there is provided an aqueous system including one or more polymeric precursors according to either one of Formulae I and II and one or more water soluble initiator compounds.

Generally, the composition or system of the present invention includes 1 wt. % or less volatile organic compound (VOC), where a VOC may be defined as an organic compound having an initial boiling point less than or equal to 250° C. measured at a standard atmospheric pressure of 101.3 kPa. Suitably the composition or system of the present invention includes less than 0.01 wt. % VOC.

According to an aspect of the present invention, there is provided a method of treating a substrate (generally textile fibres) comprising:
   providing a polymeric precursor including a group of either one of Formulae I and II;
   applying the polymeric precursor to the textile fibres;
   polymerising the polymeric precursor so as to produce a polymeric coating on the textile fibres.

According to a further aspect of the present invention, there is provided a method of coating a substrate comprising:
   providing a polymeric precursor including a group of either one of Formulae I and II; either
   applying the polymeric precursor to the textile fibres and polymerising the polymeric precursor so as to produce a polymeric coating on the textile fibres; or
   polymerising the polymeric precursor, with a low surface energy substrate to form a polymeric coating on the substrate.

According to a further aspect of the present invention there is provided a composite article including a textile layer having a first and second face, each of the first and second faces having a polymeric coating thereon;
   a first polymeric layer adhered to the polymeric coating on the first face of the textile layer; and
   a second polymeric layer adhered to the polymeric coating on the second face of the textile layer;
   in which the polymeric coatings on the first and second faces of the textile layer are formed by polymerising a polymeric precursor including a group of either one of Formulae I and II.

The polymeric precursor of any one of the methods disclosed herein may be in the form of a composition as disclosed herein.

According to a further aspect of the present invention, there is provided a kit of parts for use in the treatment of textile fibres, in particular to promote the adhesion of textile fibres to polymeric materials, metals or to fix dyes thereon, said kit of parts including any of the compounds or compositions described herein and an applicator device such as a syringe, spatula, or spray device. The kit of parts generally includes instructions for use.

Definitions

Ambient temperature denotes the range 20 to 26° C., with an average temperature of 23 to 25° C., generally around 23° C.

All numerical values provided incorporate 10% less than and 10% more than the numerical value provided.

Hydrocarbyl

The term "hydrocarbyl" as used herein includes reference to moieties consisting exclusively of hydrogen and carbon atoms; such a moiety may comprise an aliphatic and/or an aromatic moiety. The moiety may comprise 1, 2, 3, 4, 5, 6, 7, 8, 9, 10, 11, 12, 13, 14, 15, 16, 17, 18, 19 or 20 carbon atoms. Examples of hydrocarbyl groups include $C_{1-6}$ alkyl (e.g. $C_1$, $C_2$, $C_3$ or $C_4$ alkyl, for example methyl, ethyl, propyl, isopropyl, n-butyl, sec-butyl or tert-butyl); $C_{1-6}$ alkyl substituted by aryl (e.g. benzyl) or by cycloalkyl (e.g. cyclopropylmethyl); cycloalkyl (e.g. cyclopropyl, cyclobutyl, cyclopentyl or cyclohexyl); alkenyl (e.g. 2-butenyl); alkynyl (e.g. 2-butynyl); aryl (e.g. phenyl, benzyl, naphthyl or fluorenyl) and the like. A hydrocarbyl may be saturated or unsaturated and may include alkyl, alkenyl, alkynyl, haloalkyl, carbocyclyl, for example heterocyclyl, aryl and heteroaryl groups. A hydrocarbyl group or portion may be straight chain or branched, and may be substituted or unsubstituted.

Alkyl

The terms "alkyl" and "$C_{1-6}$ alkyl" as used herein can be used interchangeably and include reference to a straight or branched chain alkyl moiety having 1, 2, 3, 4, 5 or 6 carbon atoms. This term includes reference to groups such as methyl, ethyl, propyl (n-propyl or isopropyl), butyl (n-butyl, iso-butyl, sec-butyl or tert-butyl), pentyl, hexyl and the like. In particular, alkyl may have 1, 2, 3 or 4 carbon atoms. Haloalkyl relates to an alkyl radical preferably having 1 to 8 carbon atoms, preferably 1 to 4 carbon atoms, substituted with one or more halide atoms for example $CH_2CH_2Br$, $CF_3$ or $CCl_3$. The term "small alkyl group" refers to an alkyl group having a carbon backbone of 1 to 6 carbon atoms, typically 1 to 4 carbon atoms.

Alkenyl

The terms "alkenyl" and "$C_{2-6}$ alkenyl" as used herein can be used interchangeably and include reference to a straight or branched chain alkyl moiety having 2, 3, 4, 5 or 6 carbon atoms and having, in addition, at least one double bond, of either E or Z stereochemistry where applicable. This term. includes reference to groups such as ethenyl, 2-propenyl, 1-butenyl, 2-butenyl, 3-butenyl, 1-pentenyl, 2-pentenyl, 3-pentenyl, 1-hexenyl, 2-hexenyl and 3-hexenyl and the like.

Alkynyl

The terms "alkynyl" and "$C_{2-6}$ alkynyl" as used herein can be used interchangeably and include reference to a straight or branched chain alkyl moiety having 2, 3, 4, 5 or 6 carbon atoms and having, in addition, at least one triple bond. This term includes reference to groups such as ethynyl, 1-propynyl, 2-propynyl, 1-butynyl, 2-butynyi, 3-butynyl, 1-pentynyl, 2-pentynyl, 3-pentynyl, 1-hexynyl, 2-hexynyl and 3-hexynyl and the like.

Alkoxy

The terms "alkoxy" and "$C_{1-6}$ alkoxy" as used herein can be used interchangeably and include reference to —O-alkyl, wherein alkyl is straight or branched chain and comprises 1, 2, 3, 4, 5 or 6 carbon atoms. In one class of embodiments, alkoxy has 1, 2, 3 or 4 carbon atoms. This term includes reference to groups such as methoxy, ethoxy, propoxy, isopropoxy, butoxy, tert-butoxy, pentoxy, hexoxy and the like.

Cycloalkyl

The term "cycloalkyl" as used herein includes reference to an alicyclic moiety having 3, 4, 5, 6, 7 or 8 carbon atoms. The group may be a bridged or polycyclic ring system.

More often cycloalkyl groups are monocyclic. This term includes reference to groups such as cyclopropyl, cyclobutyl, cyclopentyl, cyclohexyl, norbornyl, bicyclo[2.2.2]octyl and the like.

Aryl

The term "aryl" as used herein includes reference to an aromatic ring system comprising 6, 7, 8, 9, 10, 11, 12, 13, 14, 15 or 16 ring carbon atoms. Aryl is often phenyl but may be a polycyclic ring system, having two or more rings, at least one of which is aromatic. This term includes reference to groups such as phenyl, naphthyl, fluorenyl, azulenyl, indenyl, anthryl and the like.

Carbocyclyl

The term "carbocyclyl" as used herein includes reference to a saturated (e.g. cycloalkyl) or unsaturated (e.g. aryl) ring moiety having 3, 4, 5, 6, 7, 8, 9, 10, 11, 12, 13, 14, 15 or 16 carbon ring atoms. In particular, carbocyclyl includes a 3- to 10-membered ring or ring system and, in particular, a 5- or 6-membered ring, which may be saturated or unsaturated. A carbocyclic moiety is, for example, selected from cyclopropyl, cyclobutyl, cyclopentyl, cyclohexyl, norbornyl, bicyclo[2.2.2]octyl, phenyl, benzyl, naphthyl, fluorenyl, azulenyl, indenyl, anthryl and the like.

Heterocyclyl

The term "heterocyclyl" as used herein includes reference to a saturated (e.g. heterocycloalkyl) or unsaturated (e.g. heteroaryl) heterocyclic ring moiety having from 3, 4, 5, 6, 7, 8, 9, 10, 11, 12, 13, 14, 15 or 16 ring atoms, at least one of which is selected from nitrogen, oxygen, phosphorus, silicon and sulphur. In particular, heterocyclyl includes a 3- to 10-membered ring or ring system and more particularly a 5- or 6- or 7-membered ring, which may be saturated or unsaturated.

A heterocyclic moiety is, for example, selected from oxiranyl, azirinyl, 1,2-oxathiolanyl, imidazolyl, thienyl, furyl, tetrahydrofuryl, pyranyl, thiopyranyl, thianthrenyl, isobenzofuranyl, benzofuranyl, chromenyl, 2H-pyrrolyl, pyrrolyl, pyrrolinyl, pyrrolidinyl, imidazolyl, imidazolidinyl, benzimidazolyl, pyrazolyl, pyrazinyl, pyrazolidinyl, thiazolyl, isothiazolyl, dithiazolyl, oxazolyl, isoxazolyl, pyridyl, pyrazinyl, pyrimidinyl, piperidyl, piperazinyl, pyridazinyl, morpholinyl, thiomorpholinyl, especially thiomorpholino, indolizinyl, isoindolyl, 3H-indolyl, indolyl, benzimidazolyl, cumaryl, indazolyl, triazolyl, tetrazolyl, purinyl, 4H-quinolizinyl, isoquinolyl, quinolyl, tetrahydroquinolyl, tetrahydroisoquinolyl, decahydroquinolyl, octahydroisoquinolyl, benzofuranyl, dibenzofuranyl, benzothiophenyl, dibenzothiophenyl, phthalazinyl, naphthyridinyl, quinoxalyl, quinazolinyl, quinazolinyl, cinnolinyl, pteridinyl, carbazolyl, β-carbolinyl, phenanthridinyl, acridinyl, perimidinyl, phenanthrolinyl, furazanyl, phenazinyl, phenothiazinyl, phenoxazinyl, chromenyl, isochromanyl, chromanyl and the like.

Halogen

The term "halogen" as used herein includes reference to F, Cl, Br or I. In particular, halogen may be F or Cl.

Substituted

The term "substituted" as used herein in reference to a moiety means that one or more, especially up to 5, more especially 1, 2 or 3, of the hydrogen atoms in said moiety are replaced independently of each other by the corresponding number of the described substituents. The term "optionally substituted" as used herein means substituted or unsubstituted.

It will, of course, be understood that substituents are only at positions where they are chemically possible, the person skilled in the art being able to decide (either experimentally or theoretically) without inappropriate effort whether a particular substitution is possible. For example, amino or hydroxy groups with free hydrogen may be unstable if bound to carbon atoms with unsaturated (e.g. olefinic) bonds. Additionally, it will of course be understood that the substituents described herein may themselves be substituted by any substituent, subject to the aforementioned restriction to appropriate substitutions as recognised by the skilled man.

Independently

Where two or more moieties are described as being "each independently" selected from a list of atoms or groups, this means that the moieties may be the same or different. The identity of each moiety is therefore independent of the identities of the one or more other moieties.

Compounds of Formula I

According to a first aspect of the present invention there is provided a compound of Formula I:

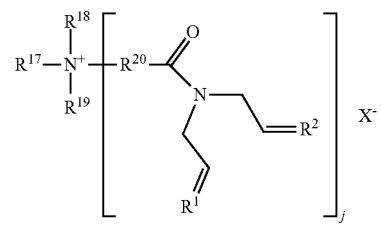

Wherein each of $R^{17}$ to $R^{19}$ independently represents an optionally substituted hydrocarbyl group, or hydrogen; generally an aliphatic hydrocarbon group (e.g. $C_{1-6}$ alkyl, alkenyl, alkynyl), in particular an optionally substituted alkyl group, typically $C_{1-6}$ alkyl.

$R^{20}$ represents an optionally substituted hydrocarbyl group, generally a $C_{1-6}$ alkyl group such as a methyl, ethyl or propyl group, suitably a methyl or ethyl group.

Each of $R^1$ and $R^2$ independently represents an optionally substituted hydrocarbyl group, generally $C_{1-6}$ alkyl, typically a methyl, ethyl or propyl group, suitably a methyl group.

$X^-$ is a counterion.

J is an integer from 1 to 4 (generally 1 or 2), wherein
where J is 2, one of $R^{17}$ to $R^{19}$ is absent,
where J is 3, two of $R^{17}$ to $R^{19}$ are absent,
where J is 4, all of $R^{17}$ to $R^{19}$ are absent.

The compounds of Formulae I and II are generally water soluble at ambient temperature and pressure. Accordingly, the compounds of Formulae I and II can be applied to a substrate without the need of organic solvents, such as VOC. As noted above, such organic solvents are potentially hazardous both for human health and for the environment, leading to concerted efforts to reduce or remove their presence in adhesives and coatings. However, up to now the reduction or removal of such organic solvents has negatively impacted on the performance of adhesives and coatings. In contrast, the compounds of the present invention may be applied in an aqueous solution to a substrate. As the compounds of the present invention are soluble in water, the coating applied is even and regular. Following application, volatile organic compounds are therefore not evaporated from the substrate. The compounds and methods of the present invention are therefore associated with environmental advantages compared to prior art non-cationic polymeric precursors which are generally provided in VOC solvent-based compositions and systems.

The compounds of Formulae I and II generally have a water solubility of 40% w/w or more, typically 50% w/w or more at ambient temperature and pressure.

The compounds of Formulae I and II are suitably provided in the form of a composition, generally comprising less than 30% w/w compounds of Formulae I and II, generally 5 to 20% w/w.

The compounds of Formulae I and II constitute polymeric precursors, including several polymerisable groups. Surprisingly, including a nitrogen cation spaced from the diallyl amide group results in polymerisation being initiated under far milder conditions compared to equivalent compounds which do not include a nitrogen cation. The inclusion of a nitrogen cation in the bridging group of the polymeric precursors of the present invention results in a monomer having a relatively high water solubility at ambient temperature and pressure. This then allows use of a water soluble initiator which can be activated at a lower temperature than an equivalent organic initiator. In an aqueous system such as that possible with the polymeric precursors of the present invention, the polymerisation temperature is generally less than 130° C., typically less than 110° C., suitably 100° C. or less, more suitably around 70 to 100° C. The polymerisation temperature of the polymeric precursors of the present invention is generally more than 50° C. In contrast, the polymerisation temperature in an equivalent organic system is generally more than 135° C., suitably around 140 to 170° C.

The initiator compounds generally have a water solubility of up to 30% w/w, typically up to 20% w/w.

The initiator compounds are generally used at less than 5% w/w, typically less than 3% w/w, suitably less than 1% w/w.

Any suitable initiator compound may be used. According to one embodiment, the initiator compound is selected from the group consisting of:

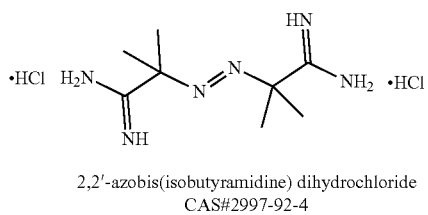

2,2'-azobis(isobutyramidine) dihydrochloride
CAS#2997-92-4

Vazo 56

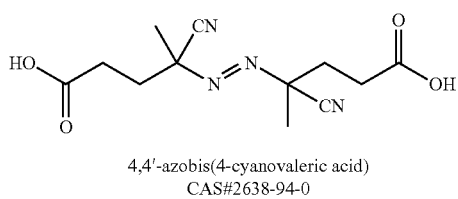

4,4'-azobis(4-cyanovaleric acid)
CAS#2638-94-0

Vazo 68

According to one embodiment, the initiator compound is:

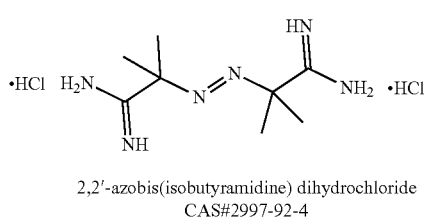

2,2'-azobis(isobutyramidine) dihydrochloride
CAS#2997-92-4

Vazo 56

According to one embodiment, two of the $R^{17}$ to $R^{19}$ groups of formula (I) or (II) may together form a cyclic group. One or more of $R^1$, $R^2$, and/or $R^{17}$ to $R^{20}$ may represent a hydrocarbyl group independently substituted with one or more of the groups selected from small hydrocarbyl group, typically small alkyl group cycloalkyl group, $C_{1\ to\ 6}$ alkoxy, silyl, halogen, oxo (i.e. hydroxyl), thio, nitro (i.e. amino), trifluoromethyl and/or cyano; typically silyl, oxo and/or nitro. Particular mention may be made of the groups hydroxyl, $-Si(OR^{13})_3$, $-NR^{13}_2-OR^{13}$, $-SR^{13}$, $-C(O)R^{13}$, $-C(O)OR^{13}$, $-OC(O)R^{13}$, $-NR^{13}COR^{13}$, $NR^{13}CONR^{13}_2$, $-NR^{13}COR^{13}$, $NR^{13}, CO_2R^{13}$, $-S(O)R^{13}$, $-S(O)_2R^{13}$, $-SONR^{13}_2$, $NR^{13}S(O)_2R^{13}$, $-CSR^{13}$, $-N(R^{13})R^{13}$, $-C(O)N(R^{13})R^{13}$, $-SO_2N(R^{13})R^{13}$, and $R^{13}$.

Each $R^{13}$ group may be independently selected from hydrogen, hydroxyl, hydrocarbyl (e.g. $C_{1-6}$ alkyl, alkenyl, alkynyl, or haloalkyl), carbocyclyl and $-(CH_2)_m$-heterocyclyl, and each $R^{13}$ may optionally and independently be substituted with one or more halogen, cyano, amino, hydroxyl, $C_{1-6}$ alkyl or cycloalkyl and $C_{1-6}$ alkoxy;

M is an integer from 1 to 6.

According to one embodiment, one or more of Ri, $R^2$, and/or $R^{17}$ to $R^{20}$ may represent a hydrocarbyl group, suitably an alkyl group, substituted with one or more of the groups selected from small alkyl group, $-Si(O-C_{1\ to\ 6}$ alkyl$)_3$ (generally $-Si(OCH_3)_3$ or $-Si(OC_2H_5)_3$), $-COOH$, $NH_2$ and OH.

According to one embodiment one or more of $R^1$, $R^2$, and/or $R^{17}$ to $R^{20}$ may represent an unsubstituted hydrocarbyl group, in particular an unsubstituted alkyl group.

According to one embodiment at least one of $R^{17}$ to $R^{19}$ represents an optionally substituted alkyl group, generally an optionally substituted $C_{1-6}$ alkyl group; typically at least one of $R^{17}$ to $R^{19}$ represents a substituted alkyl group.

Preferred substituents for the $R^{17}$ to $R^{19}$ hydrocarbyl group include amino, hydroxyl, silyl, including a silyl group substituted with one or more alkoxy groups such as a methoxy, ethoxy and propoxy groups.

Generally one of $R^{17}$ to $R^{19}$ represents an unsubstituted $C_{1\ to\ 6}$ to alkyl group, or a $C_{1\ to\ 6}$ alkyl group substituted with one of the following groups: $Si(OCH_3)_3$, $Si(OC_2H_5)_3$, COOH, $NH_2$ and OH.

Alternatively, at least one of $R^{17}$ to $R^{19}$ may represent an optionally substituted long chain alkyl group (e.g. $C_{10}$ to $C_{30}$); generally one of $R^{17}$ to $R^{19}$ represents a $C_{10}$ to $C_{30}$ alkyl group, generally a $C_{15}$ to $C_{25}$ alkyl group.

Where one of $R^{17}$ to $R^{19}$ represents a $C_{10}$ to $C_{30}$ alkyl group, textiles treated with the compound of Formulae I or II have good associated handling properties, for example softness and flexibility.

Generally at least one of $R^{17}$ to $R^{19}$ represents hydrogen or methyl, typically one of $R^{17}$ to $R^{19}$ represents hydrogen or methyl, more typically hydrogen.

Suitably J represents the integer 1 or 2, more suitably 2.

Generally, $R^1$, $R^2$ and $R^{20}$ represent an unsubstituted small alkyl group, in particular a $C_{1-4}$ alkyl group, typically methyl or ethyl. Typically $R^1$ and $R^2$ represent methyl.

Suitably $R^{20}$ represents methyl or ethyl.

Typically, each of $R^{17}$ to $R^{19}$ independently represents an optionally substituted $C_{1-6}$ alkyl group, or hydrogen; $R^{20}$ represents a methyl or ethyl group; and J represents the integer 1 or 2, wherein if J represents 2, one of $R^{17}$ to $R^{19}$ is absent.

According to one embodiment, the compound of Formula I has the structure as selected from the following group:

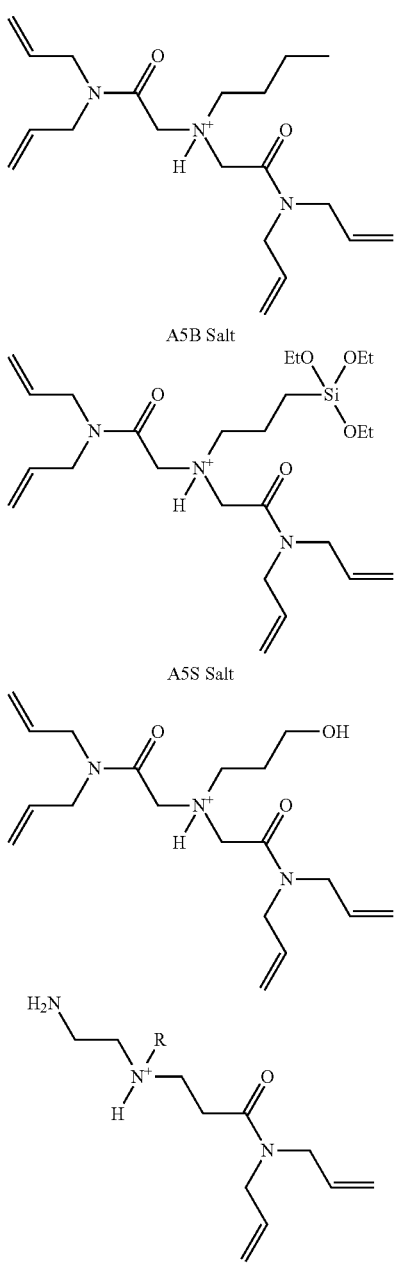

A5B Salt

A5S Salt

Where R represents a substituted or unsubstituted alkyl group, in particular straight chain alkyl group.

Compounds of Formula II

According to a second aspect of the present invention there is provided a compound of Formula II:

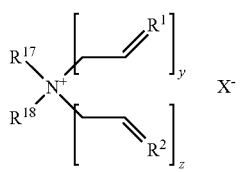

Wherein $R^1$, $R^2$, $R^{17}$, $R^{18}$ are as defined herein;
Y is an integer of from 1 to 3, generally 1;
Z is an integer of from 1 to 3, generally 1;

wherein the combination of the integers represented by y and z must be 4 or less, and where the combination of the integers represented by y and z is 3, one of $R^{17}$ and $R^{18}$ is absent, and where the combination of the integers represented by y and z is 4, both of $R^{17}$ and $R^{18}$ are absent;

$X^-$ represents a counter ion.

Generally one of $R^{17}$ and $R^{18}$ represents an unsubstituted $C_{1\ to\ 6}$ alkyl group, or a $C_{1\ to\ 6}$ alkyl group substituted with one of the following groups: $Si(OCH_3)_3$, $Si(OC_2H_5)_3$, COOH, $NH_2$ and OH.

Alternatively, at least one of $R^{17}$ and $R^{18}$ may represent an optionally substituted long chain alkyl group (e.g. $C_{10}$ to $C_{30}$); generally one of $R^{17}$ to $R^{19}$ represents a $C_{10}$ to $C_{30}$ alkyl group, generally a $C_{15}$ to $C_{25}$ alkyl group.

According to one embodiment, at least one of $R^{17}$ and $R^{18}$ represents a long chain alkyl group (e.g. $C_{10}$ to $C_{30}$). Typically Y represents 1, Z represents 1; one of $R^{17}$ and $R^{18}$ represents an optionally substituted $C_{10}$ to $C_{30}$ alkyl group and one of $R^{17}$ and $R^{18}$ represents methyl, ethyl or hydrogen.

The compound of Formulae I or II is generally stabilised through the presence of the counterions described herein. Generally the charge of the counter-ion balances the charge of the compound of Formulae I or II.

Composition

There is provided in one aspect, a composition comprising a polymeric precursor including a group of Formula I or Formula II (including cationic polymeric precursor and one or more counter-ions) and an aqueous solvent.

According to one embodiment, there is provided a salt comprising a compound of either one of Formulae I and II (including cationic polymeric precursor and one or more counter-ions). The counter-ions are generally anions selected from or consisting of the group consisting of halide, in particular chloride or fluoride, sulfate, sulfonate (such as 2-acrylamido-2-methylpropane sulfonate (AMPS)), sulfamate, phosphonate (in particular a vinyl phosphonate), lactate, acetate, glycolate, citrate and itaconate.

Typically the counter-ions are anions selected from the group consisting of sulfate, sulfonate, sulfamate, phosphonate, lactate and acetate, glycolate, citrate and itaconate.

Generally the salt includes a compound of Formula I.

The counter-ion may have the structure of the group consisting of:

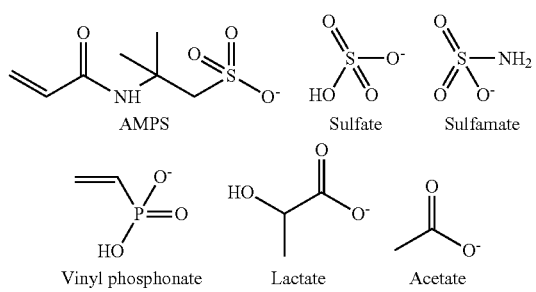

AMPS   Sulfate   Sulfamate

Vinyl phosphonate   Lactate   Acetate

Halide, in particular chloride; glycolate; citrate; or itaconate.

According to one embodiment, the counter-ion may include a polymerisable group, and the counterion may be polymerised under the conditions used to polymerise the polymeric precursor of Formulae I or II. Generally the counter-ion includes at least one alkenyl group.

According to one embodiment, the counter-ion includes a basic nitrogen group.

Suitably the counter-ion includes a phosphonate group.

Typically the nitrogen cation specified in Formulae I and II is the only cation included in the compounds of Formulae I and II, and a compound of Formula I or II has an associated charge of +1. Generally the counter-ion has an associated charge of −1.

The compound of Formula I or Formula II and the counter-ion are generally present in the composition at approximately equimolar amounts to provide a charge balanced composition.

According to one embodiment, the salt includes a single type of compound according to Formula I or Formula II.

Generally the salt comprises a single type of counter-ion.

The polymer may be cross-linked or straight chain.

Generally the composition incorporates a water solvent rather than an organic solvent. Typically the amount of organic solvent in the composition is less than 0.1 wt %, suitably the composition does not contain any organic solvent.

The composition of the present invention may include pigments, fillers and/or extenders. Typical pigments include titanium dioxide, zinc oxide, zinc yellow, carbon black, phthalocyanine green, phthalocyanine blue, ultramarine blue and vermilion. However, one of ordinary skill in the art would be well aware of other suitable pigments.

Examples of fillers and extenders include quartz sand, talc, barite, kaolin clay and limestone.

The composition of the present invention may also include additives such as one or more of driers, plasticisers, fungicides, biocides, insecticides, flow control agents, defoamers, emulsifiers, UV stabilisers, anti-skimming agents, adhesion promoters, corrosion inhibitors and texturisers.

Generally polymerisation of the polymeric precursors is initiated thermally. However, other types of initiation will be well known to one of ordinary skill in the art, for instance chemical initiation, UV initiation, microwave induced polymerization and electrically induced polymerization.

According to a further aspect of the present invention, there is provided an aqueous system including one or more polymeric precursors according to either one of Formulae I and II and one or more water soluble initiator compounds.

One of ordinary skill in the art would be aware of suitable water soluble initiator compounds. Examples of such water soluble initiators include:

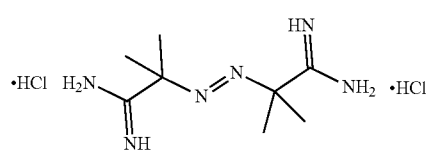

2,2′-azobis(isobutyramidine) dihydrochloride
CAS#2997-92-4

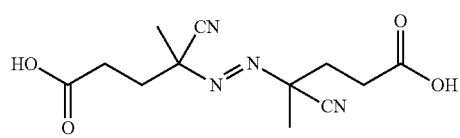

4,4′-azobis(4-cyanovaleric acid)
CAS#2638-94-0

Generally the aqueous system includes 1 to 30% w/w (typically 5 to 20% w/w) one or more polymeric precursors according to either one of Formulae I and II and less than 2% w/w (generally less than 1% w/w) one or more water soluble initiator compounds.

Methods

According to an aspect of the present invention, there is provided a method of treating textile fibres comprising:
providing a polymeric precursor including a group of either one of Formulae I and II;
either (i) coating the textile fibres with the polymeric precursor and polymerising the polymeric precursor to form a polymeric coating, or (ii) polymerising the polymeric precursor and contacting the polymerised polymeric precursor with the textile fibres to form a polymeric coating on the textile fibres The method generally involves applying the polymeric precursor to the textile fibres; andpolymerising the polymeric precursor so as to produce a polymeric coating on the textile fibres.

Alternatively, the polymeric precursor may be polymerised prior to contacting with textile fibres. The polymerised polymeric precursor may then be contacted with textile fibres.

The polymeric precursors of the present invention promote improved adhesion of the polymeric fibres to a substrate, in particular a low energy substrate such as a polymeric surface or a metal. Alternatively, or additionally the polymeric precursors of the present invention may treat textile fibres to allow improved adhesion of a dye onto the fibres.

Generally the polymeric precursor of either one of Formulae I and II is polymerised in the presence of one or more of the counter-ions described herein.

Generally the polymeric precursor is applied to the substrate (before or after polymerisation) in an aqueous solvent, suitably wherein the only solvent used is water; typically wherein the method is conducted entirely in the presence of an aqueous solvent or no solvent.

The treated textile fibres generally have improved surface feel as well as improved adhesion properties.

Generally 5 to 10 g polymeric precursor are added to each $m^2$ area of the surface of the textiles (before or after polymerisation).

The textile fibres may be synthetic fibres. Examples of synthetic textile fibres which may be treated in accordance with the invention are aramid, nylon and polyester. Thus, the treated textile fibres may include aramid, nylon or polyester fibres. The textile fibres may consist entirely of aramid fibres, or may comprise a mixture of aramid fibres and fibres of at least one other kind. The aramid fibres may be meta-aramid fibres and/or para-aramid fibres. Examples of suitable aramid fibres are Kevlar®, Kermel® and Twaron®. Examples of mixtures of aramid fibres with fibres of another kind or kinds include various mixtures of aramid fibres with viscose fibres, which may be flame retardant (FR) viscose fibres. Blends such as a 50% aramid/50% FR viscose mixture or a mixture of para-aramid, rayon and polybenzimidazole fibres may be used. The treatment of natural fibres is also in the scope of the invention.

The method may be used for dyeing textile fibres, and may include the further step of contacting the textile fibres with at least one dye, in which the polymeric coating acts to promote adhesion of the dye to the textile fibres. It is highly advantageous that aramid textile fibres may be dyed in this manner.

The dye may be an acid dye or a basic dye. Adhesion to acid and basic dyes can be advantageously enhanced by the provision of one or more suitable functional groups within the polymeric precursor. For example, an amine moiety may be advantageously used in conjunction with acid dyes, and a carboxyl substituent may be advantageously used in conjunction with a basic dye. Without wishing to be bound by any one particular theory or conjecture, it is believed that the presence of these functional groups allows bonding or another interaction to occur between the functional group and the dye. The use of other types of dye is within the scope of the invention. Furthermore, the invention is not limited to bonding or interactions between the function group and the dye. For example, it is envisaged that dyes may be retained on the textile fibres through other mechanisms, such as diffusion into the polymeric structure of the coating. In other, at least one substance, such as a pigment, is contained in a binder, and the polymeric coating acts to promote adhesion to the binder and/or substance to the textile fibres. Binders and useful substances which are well known in the art may be used. For example, carbon black may be used as a pigment. It is possible to use a binder containing one or more dyes.

The textile fibres may be a plain, uncoloured textile fibres. Alternatively, and advantageously, the textile fibres beneath the polymeric coating may be pre-coloured with one or more pre-colouring, light absorbing substances. It is understood that such pre-colouring light absorbing substances are present on the textile fibres prior to coating with the polymeric coating, and therefore are situated underneath the polymeric coating. An advantage with using pre-coloured textile fibres is that it reduces the complexity and expense of any subsequent step in which colouring substances such as dyes and pigments are adhered onto the polymeric coating. The polymeric coating of the invention can adhere well to pre-coloured textile fibres as well as to plain, uncoloured textile fibres.

The treatment of the textile fibres may be for bonding the textile fibres to a polymeric material, and may include a further step of contacting the textile fibres with the polymeric material, in which the polymeric coating acts to promote adhesion of the polymeric material to the textile fibres. Although textile fibres may be adhered to a range of polymeric materials in this way, it is particularly advantageous that adhesion to low surface energy polymeric materials can be achieved. In preferred embodiments, the polymeric material is an elastomer. For the avoidance of doubt, the term "elastomer" includes reference to natural and synthetic rubbers. Textile fibres may be adhered to various elastomers which have traditionally been difficult to adhere to, such as silicone rubbers, fluoro-silicone rubbers, fluorocarbon rubbers or ethylene propylene rubbers (EPDM).

There is also provided a method of coating a substrate comprising:
  providing a polymeric precursor including a group of either one of Formulae I and II; either
  applying the polymeric precursor to the substrate and polymerising the polymeric precursor so as to produce a polymeric coating on the substrate; or polymerising the polymeric precursor, and contacting the polymerised polymeric precursor with a substrate to form a polymeric coating on the substrate.

Generally the substrate is a low energy substrate such as a polymeric substrate, in particular a rubber substrate, an elastomeric substrate or a metal substrate. The substrate suitably has a surface energy of less than or equal to 42 mJ/m$^2$.

Typically, the textile fibres are contacted with the polymeric material under conditions of elevated temperature and/or pressure.

As noted above, the polymerisation of polymeric precursors of Formula I or Formula II generally requires less stringent initiation conditions than equivalent precursors which do not comprise a nitrogen cation on the bridging portion. Accordingly, where polymerisation of the polymeric precursor is thermally initiated, surprisingly low temperatures are required. According to one embodiment, polymerisation may be initiated at ambient temperatures.

There is also provided a composite article including a textile layer having a first and second face, each of the first and second faces having a polymeric coating thereon;
  a first polymeric layer adhered to the polymeric coating on the first face of the textile layer; and
  a second polymeric layer adhered to the polymeric coating on the second face of the textile layer;
  in which the polymeric coatings on the first and second faces of the textile layer are formed by polymerising a polymeric precursor including a group of either one of Formulae I and II.

In this way, a composite structure can be formed having a textile bonded to a polymeric material. The polymeric material is generally a rubber, including a silicon containing rubber. The textile fibres may be adhered to a hosing or belt formed from the polymeric material. Reinforced rubber pressure hosing can be produced. Other applications include the manufacture of tyres, conveyor belts and air cushions.

According to one embodiment, the composite structure may be a sports ball such as a tennis ball. Alternatively, the composite structure may be in the form of protective clothing.

Specific Compositions

According to one embodiment there is provided a method of treating textile fibres including:
  i. providing a polymeric precursor including a group of Formula I and a counter-ion of AMPS or vinyl phosphonate
  ii. either (i) coating the textile fibres with the polymeric precursor and polymerising the polymeric precursor to form a polymeric coating, or (ii) polymerising the polymeric precursor and contacting the polymerised polymeric precursor with the textile fibres to form a polymeric coating on the textile fibres Generally the method includes the steps of:
  i) applying the polymeric precursor to the textile fibres; and
  ii) polymerising the polymeric precursor so as to produce a polymeric coating on the textile fibres.

Suitably in the compound of Formula I J represents 2, $R^{20}$ represents methyl, one of $R^{17}$ to $R^{19}$ is absent, one of $R^{17}$ to $R^{19}$ represents hydrogen, and one of $R^{17}$ to $R^{19}$ represents an optionally substituted $R_{1-6}$ alkyl group. Generally one of $R^{17}$ to $R^{19}$ represents an unsubstituted $R_{1-6}$ alkyl group, typically an unsubstituted $R_{3-6}$ alkyl group. Alternatively, one of $R^{17}$ to $R^{19}$ represents a substituted $R_{1-6}$ alkyl group, typically substituted with an alkoxy silyl group. Suitably, one of $R^{17}$ to $R^{19}$ represents a substituted $R_{24}$ alkyl group, typically substituted with an ethoxy silyl group.

According to one embodiment, counter-ions including basic nitrogen groups are used. Such counter-ions are particularly effective in promoting adhesion of an acid dye to the textile fibres.

According to one embodiment, the counter ion includes a phosphonate group. Such counter-ions allow particularly good adhesion of the textiles on metallic surfaces.

Kit of Parts

According to a further aspect of the present invention, there is provided a kit of parts for use in the treatment of textile fibres, in particular to promote the adhesion of textile fibres to polymeric materials, metals or to fix dyes thereon, said kit of parts including any of the compounds or compositions described herein and an applicator device such as a syringe, spatula, or spray device. The kit of parts generally includes instructions for use.

Generally the kit includes instructions for use, for example the nature of application and the reaction conditions required to initiate polymerisation.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Throughout the description and claims of this specification, the words "comprise" and "contain" and variations of the words, for example "comprising" and "comprises", mean "including but not limited to", and are not intended to (and do not) exclude other moieties, additives, components, integers or steps. All documents referred to herein are incorporated by reference.

The present invention will now be described by way of example only.

Example 1: Aqueous A5B.HCl Promoted Adhesion of a Para-Aramid to Nitrile Butadiene Rubber (NBR)

A 10% aqueous solution of A5B.HCl was prepared by dissolving A5B monomer (10 g) in a mixture of 1M HCl (32 ml, 1.1 eq) and water (58 ml).

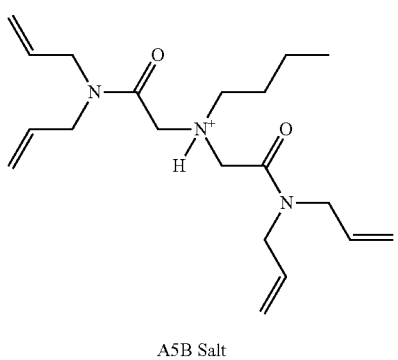 [SMILES: C=CCN(CC=C)C(=O)C[NH+](CCCC)CC(=O)N(CC=C)CC=C]

A5B Salt

To this solution was added the thermal initiator Vazo 56 (0.7 g) and stirred until fully dissolved.

The para-aramid (Twaron®) was dipped in the above solution and allowed to dry at ambient for 10 mins.

The coated textile was placed in a curing oven at 165° C. for 10 mins.

Nitrile butadiene rubber was placed on the cured textile and placed in a hot press at 165° C. for 10 mins.

The assembled sample was then allowed to cool to ambient and tested for peel resistance (T-peel test) according to standard method ASTM D1876-08 on an Instron 3343 Tensiometer.

The peel resistance of the sample was measured at 1540 N/m.

Example 2: Solvent-Based A5B Promoted Adhesion of a Para-Aramid to Nitrile Butadiene Rubber (NBR)

For comparative purposes, the test described in Example 1 was repeated but using an equivalent solvent-based A5B system.

Accordingly, a 10% MEK (Methyl Ethyl Ketone) solution of A5B was prepared by dissolving A5B (10 g) in MEK (90 ml).

To this solution was added the thermal initiator dicumyl peroxide (0.7 g) and stirred until fully dissolved.

The solution was applied to the para-aramid (Twaron®) and bonded to nitrile butadiene rubber in the same way as describe in Example 1.

The peel resistance of the sample was measured at 1510 N/m.

Example 3: Aqueous Cationic A5S.HCl Promoted Adhesion of Polyester to Ethylene Propylene Diene Monomer (EPDM) Rubber A 10% aqueous solution of A5S.HCl was prepared by dissolving A5S monomer (10 g) in a mixture of 1M HCl (22 ml, 1.1 eq) and water (68 ml).

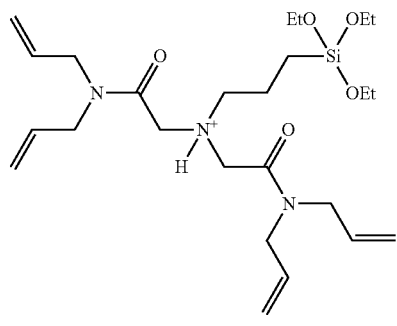

A5S Salt

To this solution was added the thermal initiator Vazo 56 (0.7 g) and stirred until fully dissolved.

The polyester fabric was dipped in the above solution and allowed to dry at ambient for 10 mins.

The coated textile was placed in a curing oven at 165° C. for 10 mins.

EPDM rubber was placed on the cured textile and placed in a hot press at 165° C. for 10 mins.

The assembled sample was then allowed to cool to ambient and tested for peel resistance (T-peel test) according to standard method ASTM D1876-08 on an Instron 3343 Tensiometer.

The peel resistance of the sample was measured at 3180 N/m.

Example 4: Solvent-Based Non-Cationic A5S Promoted Adhesion of Polyester to Ethylene Propylene Diene Monomer (EPDM) Rubber For comparative purposes, the test described in Example 3 was repeated but using an equivalent solvent-based, non-cationic system A5S system.

Accordingly, a 10% MEK (Methyl Ethyl Ketone) solution of non-cationic A5S was prepared by dissolving non-cationic A5S (10 g) in MEK (90 ml).

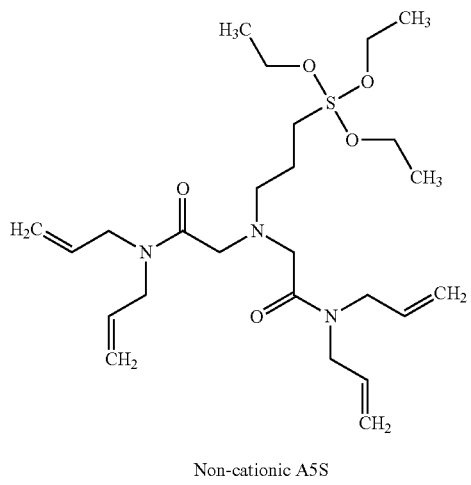 [SMILES: C=CCN(CC=C)C(=O)CN(CCCS(OCC)(OCC)OCC)CC(=O)N(CC=C)CC=C]

Non-cationic A5S

To this solution was added the thermal initiator dicumyl peroxide (0.7 g) and stirred until fully dissolved.

The solution was applied to the polyester fabric and bonded to EPDM rubber in the same way as describe in Example 3.

The peel resistance of the sample was measured at 4640 N/m.

A comparison of Examples 3 and 4 demonstrates the improved adhesion of aqueous based compositions of the present invention including cationic compounds of formula (I) or (II) compared to solvent-based compositions which include equivalent non-cationic compounds.

Example 5: Polymerization of Aqueous Cationic A5S.HCl

A 50% aqueous solution of A5S.HCl was prepared by dissolving A5S monomer (10 g) in a mixture of 37% HCl (2.2 g, 1.1 eq) and water (7.8 g).

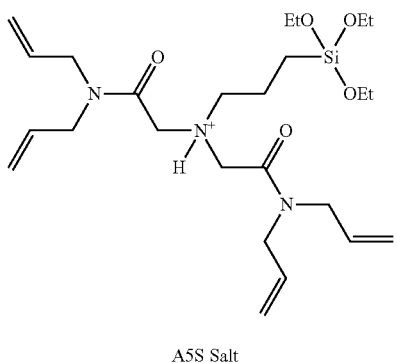 [SMILES: C=CCN(CC=C)C(=O)C[NH+](CCC[Si](OCC)(OCC)OCC)CC(=O)N(CC=C)CC=C]

A5S Salt

To this solution was added the thermal initiator 1,1'-Azobis(cyclohexanecarbonitrile) sold under the Trade Mark Vazo 56 ® (0.7 g) and stirred until fully dissolved.

The solution was warmed at an approximate rate of 5° C. per minute and monitored for polymerization.

Polymerization was observed between 64° C. and 73° C. over a duration of 3 minutes.

For comparison purposes, the experiment was repeated with the equivalent solvent-based non-cationic A5S system (see Example 6 below)

Example 6: Polymerization of Solvent-Based Non-Cationic A5S

A 50% solution of non-cationic A5S was prepared by dissolving A5S monomer (10 g) in toluene (10 ml).

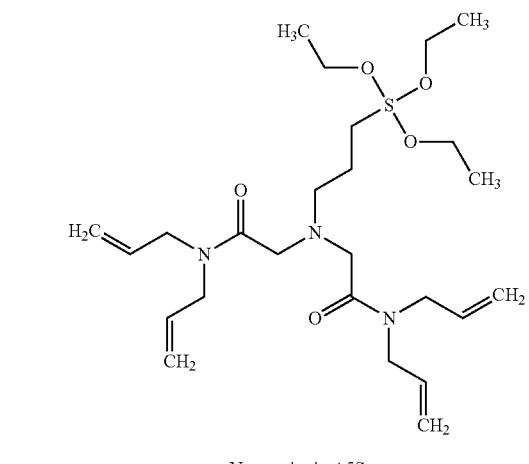

Non-cationic A5S

To this solution was added the thermal initiator 1,1'-Azobis(cyclohexanecarbonitrile) sold under the Trade Mark Vazo 67 ® (0.7 g) and stirred until fully dissolved.

The solution was warmed at an approximate rate of 5° C. per minute and monitored for polymerization.

Polymerization was observed between 87° C. and 119° C. over a duration of 15 minutes. Therefore, polymerization of solvent-based (non-cationic) A5S required a higher temperature over a longer time period than the equivalent aqueous (cationic) A5S.

Examples 5 and 6 demonstrate that polymeric precursors of Type I (with cationic charge present on the bridging nitrogen) require far milder polymerization conditions than the equivalent non-cationic compound.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following Claims.

The invention claimed is:

1. A method of treating textile fibres including:
    a) providing a polymeric precursor including a group of either one of Formula I and II:

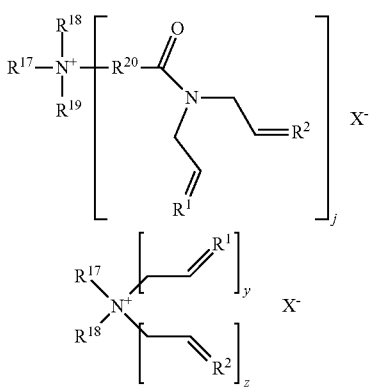

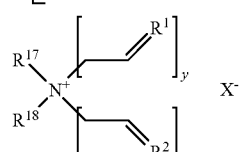

wherein each of $R^{17}$ to $R^{19}$ independently represents an optionally substituted hydrocarbyl group, or hydrogen;
$R^{20}$ represents an optionally substituted hydrocarbyl group,
each of $R^1$ and $R^2$ independently represents an optionally substituted hydrocarbyl group,
$X^-$ is a counter ion,
J is an integer from 1 to 4, wherein
   where J is 2, one of $R^{17}$ to $R^{19}$ is absent,
   where J is 3, two of $R^{17}$ to $R^{19}$ are absent,
   where J is 4, all of $R^{17}$ to $R^{19}$ are absent;
Y is an integer of from 1 to 3;
Z is an integer of from 1 to 3;
wherein the combination of the integers represented by y and z is 4 or less, and where the combination of the integers represented by y and z is 3, one of $R^{17}$ and $R^{18}$ is absent, and where the combination of the integers represented by y and z is 4, both of $R^{17}$ and $R^{18}$ are absent;

b) either (i) coating the textile fibres with the polymeric precursor and polymerising the polymeric precursor to form a polymeric coating, or (ii) polymerising the polymeric precursor and contacting the polymerised polymeric precursor with the textile fibres to form a polymeric coating on the textile fibres.

2. The method of claim 1 wherein:
each of $R^{17}$ to $R^{19}$ independently represents an optionally substituted $C_{1-6}$ alkyl group, or hydrogen;
$R^{20}$ represents a methyl or ethyl group;
and J represents the integer 1 or 2, wherein if J represents 2, one of $R^{17}$ to $R^{19}$ is absent.

3. The method as claimed in claim 1 wherein Y represents 1, Z represents 1; one of $R^{17}$ and $R^{18}$ represents an optionally substituted $C_{10}$ to $C_{30}$ alkyl group and one of $R^{17}$ and $R^{18}$ represents methyl, ethyl or hydrogen.

4. The method as claimed in claim 1 wherein at least one of $R^{17}$ to $R^{19}$ represents $C_1$-$C_6$ alkyl group substituted with one of the following groups: $Si(OCH_3)_3$, $Si(OC_2H_5)_3$, COOH, $NH_2$ and OH.

5. The method as claimed in claim 1 wherein the counterion X is selected from the group consisting of halide, sulfate, sulfonate, sulfamate, phosphonate, lactate, acetate, glycolate, citrate and itaconate.

6. The method as claimed in claim 1 wherein the counterion X is selected from the group consisting of chloride, sulfate, 2-acrylamido-2-methylpropane sulfonate (AMPS), sulfamate, vinyl phosphonate, lactate, acetate, glycolate, citrate and itaconate.

7. The method as claimed in claim 1 wherein the counterion $X^-$ comprises one or more of a basic nitrogen group and a phosphonate group.

8. The method as claimed in claim 1 wherein the counterion $X^-$ includes a group polymerisable under the conditions used to polymerise the polymeric precursor, such as an alkenyl group.

9. The method as claimed in claim 1 wherein the textile fibres are synthetic fibres.

10. A method of coating a substrate comprising:
providing a polymeric precursor including a group of either one of Formulae I and II:

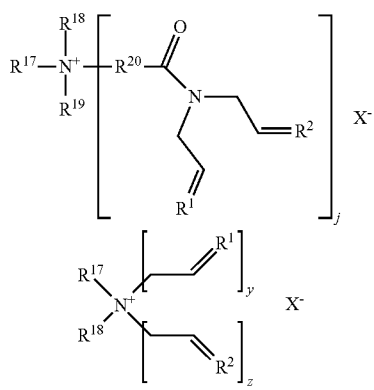

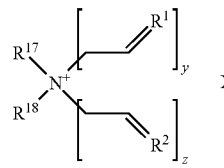

wherein each of $R^{17}$ to $R^{19}$ independently represents an optionally substituted hydrocarbyl group, or hydrogen;
$R^{20}$ represents an optionally substituted hydrocarbyl group,
each of $R^1$ and $R^2$ independently represents an optionally substituted hydrocarbyl group,
$X^-$ is a counter ion,
J is an integer from 1 to 4, wherein
   where J is 2, one of $R^{17}$ to $R^{19}$ is absent,
   where J is 3, two of $R^{17}$ to $R^{19}$ are absent,
   where J is 4, all of $R^{17}$ to $R^{19}$ are absent;
Y is an integer of from 1 to 3;
Z is an integer of from 1 to 3;
wherein the combination of the integers represented by y and z is 4 or less, and
   where the combination of the integers represented by y and z is 3, one of $R^{17}$ and $R^{18}$ is absent, and where the combination of the integers represented by y and z is 4, both of $R^{17}$ and $R^{18}$ are absent; and
either
applying the polymeric precursor to the substrate and polymerising the polymeric precursor so as to produce a polymeric coating on the substrate; or
polymerising the polymeric precursor, and contacting the polymerised polymeric precursor with the substrate to form a polymeric coating on the substrate.

11. The method as claimed in claim 10 wherein the substrate has a surface energy of less than or equal to 42 $mJ/m^2$.

12. The method as claimed in claim 1, wherein y is 1 and z is 1.

13. The method as claimed in claim 10, wherein y is 1 and z is 1.

* * * * *